US009602363B2

(12) United States Patent
Dalela

(10) Patent No.: US 9,602,363 B2
(45) Date of Patent: *Mar. 21, 2017

(54) SYSTEM AND METHOD FOR IMPLEMENTING NETWORK SERVICE LEVEL AGREEMENTS (SLAS)

(71) Applicant: Cisco Technology, Inc., San Jose, CA (US)

(72) Inventor: Ashish Dalela, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 14/280,996

(22) Filed: May 19, 2014

(65) Prior Publication Data
US 2014/0258543 A1    Sep. 11, 2014

Related U.S. Application Data

(63) Continuation of application No. 13/648,357, filed on Oct. 10, 2012, now Pat. No. 8,738,690.

(51) Int. Cl.
G06F 15/16 (2006.01)
H04L 12/24 (2006.01)
(Continued)

(52) U.S. Cl.
CPC ... *H04L 41/5006* (2013.01); *G06Q 10/06315* (2013.01); *H04L 41/5019* (2013.01);
(Continued)

(58) Field of Classification Search
CPC ............ H04L 41/5006; H04L 41/5019; H04L 45/125; H04L 45/302; H04L 47/122; H04L 47/70
See application file for complete search history.

(56) References Cited

U.S. PATENT DOCUMENTS 6,956,821 B2 * 10/2005 Szviatovszki ........... H04L 45/00
370/237
7,619,970 B2    11/2009 Iny
(Continued)

OTHER PUBLICATIONS

Notice of Allowance dated Feb. 4, 2014 from U.S. Appl. No. 13/648,357, 10 pages.

*Primary Examiner* — Moustafa M Meky
(74) *Attorney, Agent, or Firm* — Parker Ibrahim & Berg LLC; James M Behmke; Stephen D. LeBarron

(57) ABSTRACT

Some implementations provide a method including: storing, at a Network Credit Server (NCS), a service level agreement of a customer; maintaining a database of topology information of the network; receiving a request from a network device where a first plurality of packets associated with the customer have been received en-route to a destination and when the number of the first plurality of packets surpasses a pre-configured threshold number; generating, by the NCS, a reply based on the service level agreement of the customer and the topology information of the network; and sending the reply to the network device for the network device to process a second plurality of packets associated with the customer, the second plurality of packets being received at the network device subsequent to the first plurality of packets and en-route to the destination.

20 Claims, 6 Drawing Sheets

(51) Int. Cl.
*H04L 12/803* (2013.01)
*H04L 12/801* (2013.01)
*G06Q 10/06* (2012.01)
*H04L 12/911* (2013.01)
*H04L 12/729* (2013.01)
*H04L 12/725* (2013.01)

(52) U.S. Cl.
CPC .......... *H04L 45/125* (2013.01); *H04L 45/302* (2013.01); *H04L 47/122* (2013.01); *H04L 47/39* (2013.01); *H04L 47/70* (2013.01)

(56) References Cited

U.S. PATENT DOCUMENTS

| | | |
|---|---|---|
| 8,139,494 B2 | 3/2012 | Robitaille et al. |
| 8,738,690 B2 * | 5/2014 | Dalela ............................ 370/254 |
| 2001/0016914 A1 * | 8/2001 | Tabata ................ H04L 63/0272 726/15 |
| 2008/0062876 A1 * | 3/2008 | Giroux ................ H04L 12/2856 370/235 |
| 2012/0002540 A1 | 1/2012 | Siddam et al. |
| 2013/0088959 A1 | 4/2013 | Kamath et al. |
| 2013/0231081 A1 | 9/2013 | Mo et al. |

* cited by examiner

SYSTEM AND METHOD FOR IMPLEMENTING NETWORK SERVICE LEVEL AGREEMENTS (SLAS)

CROSS-REFERENCE TO RELATED APPLICATIONS

This application is a continuation application of and claims priority to U.S. application Ser. No. 13/648,357, filed on Oct. 10, 2012, the contents of which application are incorporated herein by reference.

TECHNICAL FIELD

The following disclosure relates generally to service level agreements in a network.

BACKGROUND

Network service providers often want to provide their customers with network service levels agreements (SLAs). The SLAs typically tie to network billing models to provide price differentiation based on the service rendered. Customers too may want assured bandwidths on the network. SLAs would be easy to implement in a network when all packets in the network from point A to point B follow one fixed path. In this case, an implementation of customer-specific bandwidth or quality of service (QoS) can be at the ingress port. Generally, however, it is more complex to implement SLAs if a packet can take many different paths from point A to point B. For example, if a customer owns multiple servers inside a data center and a given pair of servers can communicate with each other through different paths, then the specified services under SLAs may be dynamically split between those paths. The diverse paths can make it difficult to implement SLAs in a network.

DESCRIPTION OF EXAMPLE EMBODIMENTS

Overview

An embodiment provides a method for implementing a service level agreement in a network. The method includes: (1) providing one or more network devices, the network devices in communication with a Network Credit Server (NCS) and the NCS configured to: store a service level agreement of a customer, the service level agreement providing an upper level limit of resources in the network allocable to the customer, and maintain a database of topology information of the network, the topology information including bandwidth capacity information of links in the network; (2) receiving, at one of the network devices, a first plurality of packets associated with the customer and en-route to a destination; (3) transmitting, from the network device to NCS, a request for credit when the first plurality of packets is more than a pre-configured threshold number; and (4) forwarding, by the network device and depending on a status of a reply from the NCS, a second plurality of packets associated with the customer and received at the network device thereafter and en-route to the destination, the reply from the NCS dependent on the service level agreement of the customer and the topology information of the network.

Detailed Description of Example Embodiments

A "Network Credit Server" (NCS) can be introduced into a managed network, for example, a data center. In one configuration, the NCS is a computing device with a processor and a plurality of memories. The NCS is aware of the network topology information. For example, the NCS has up-to-date information of substantially all possible paths in the network for a given pair of ingress and egress network devices. The NCS also knows the link bandwidth of each link on a given path in the network. The NCS can receive "Credit Request" from a network device on the managed network. The network device may be, for example, a network switch, a network router, etc. The network devices on the managed network communicate with a NCS to request for credits and receive grants therefrom. In one configuration, the Credit Request includes information indicating a pair of source address and a destination address. The pair of addresses may be associated with the "Credit Request." The NCS may lookup pre-existing service level agreements (SLAs) for the customer associated with the Credit Request to determine if a credit grant can be made. The NCS may respond with a "Credit Grant" to authorize packet forwarding to the destination address provided in the pair of addresses. Once the credit to forward packet has been granted, the NCS will subtract the granted bandwidth on a particular link on the path to the destination by the amount that has just been allocated. The grant is valid for a pre-defined interval (such as, for example, 100 ms) and lapses thereafter. The credit grant is to be renewed periodically, if packets still need to be forwarded.

Figure 1:
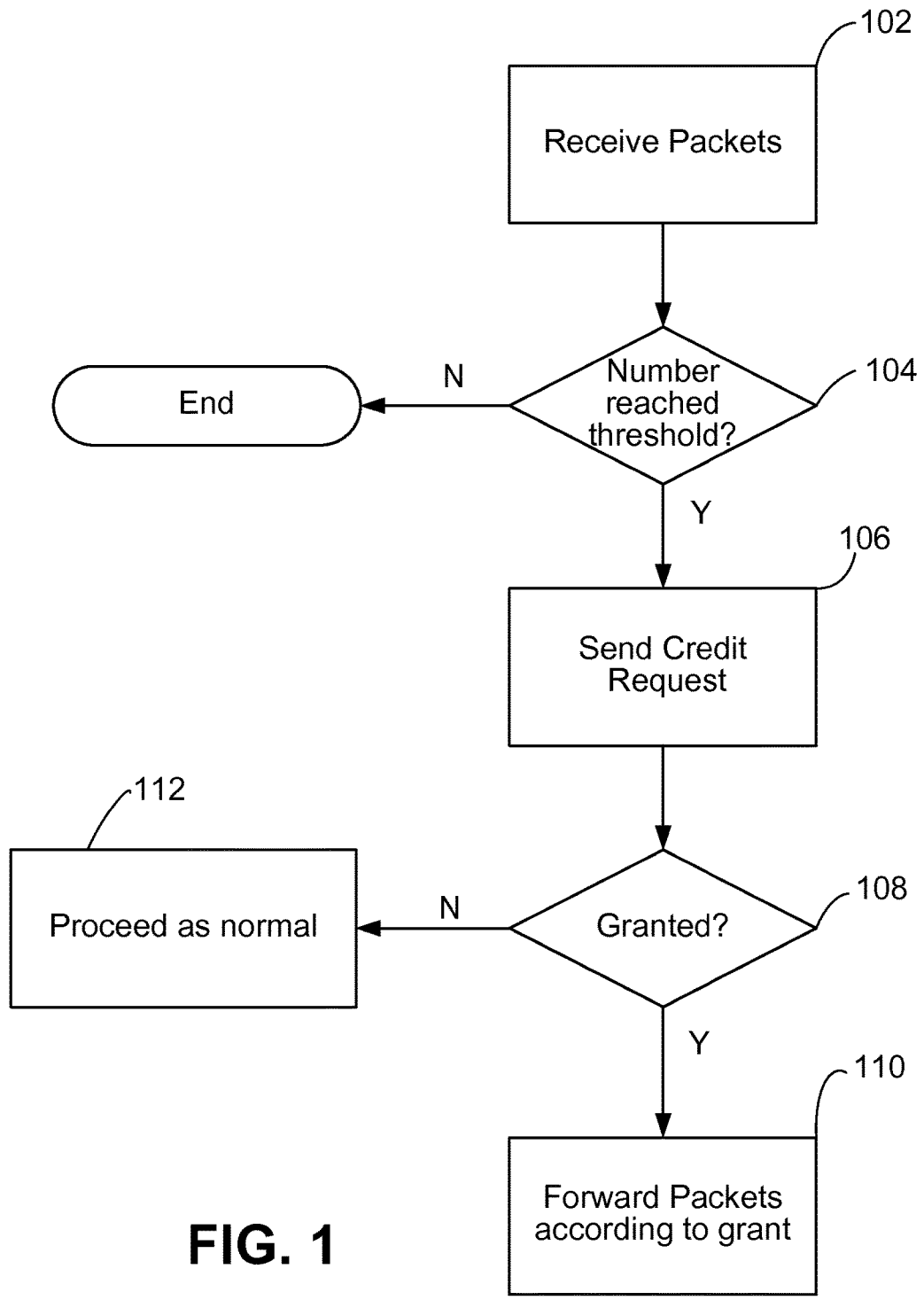
FIG. 1 shows a flow chart of an example implementation.

FIG. 1 shows a flow chart of an example implementation. In block 102, a network device, for example, an access switch/router or any other device that can implement a SLA, receives packets. The network device is capable of detecting packet flows related to a particular customer. The detection can be based on, for example, an access port, a source or a destination IP address, etc.

In block 104, the network device determines whether the number of received packets associated with the particular customer has reached a predetermined threshold. When the number of received packets associated with the particular customer exceeds the threshold, the network device determines that a new packet flow has been detected.

In block 106, the network device sends a credit request to the NCS and may expect a response. In this configuration, the credit request is sent only when the number of received packets associated with the particular customer has exceeded a certain predetermined threshold. This triggering condition helps avoiding sending very frequent requests for packet flows that are insignificant. For example, packets associated with, ARP, DHCP or Credit Requests (from other network devices on the same managed network) can be too trivial to warrant a "Credit Request."

In block 108, the network device determines whether the Credit Request has been granted by the NCS. If the Credit Request has not been sent, or a response has not been received, or a NCS is not configured, the network device will continue to forward packets normally according to a current forwarding policy and disregard providing elevated service in response to the new packet flow, as indicated by block 112. This mechanism allows the network device to fall back to current forwarding policy for the newly detected packet flow when NCS is not configured or has failed.

If the network device determined that the Credit Request has been granted, the network device will start policing packets received thereafter using the grant, as indicated by block 110. For example, after the granted number of packets/bytes have been transmitted thereafter, subsequent packets will be dropped unless the grant is renewed timely. In one implementation, the grant is conditioned on an express response from the NCS in order for the policing under the SLA to take place. In another implementation, if the grant has not been received within a certain time window, the requesting network device assumes that all packets can be forwarded. This implementation provides backward compatibility when the NCS is not present or the NCS has failed.

Figure 2:
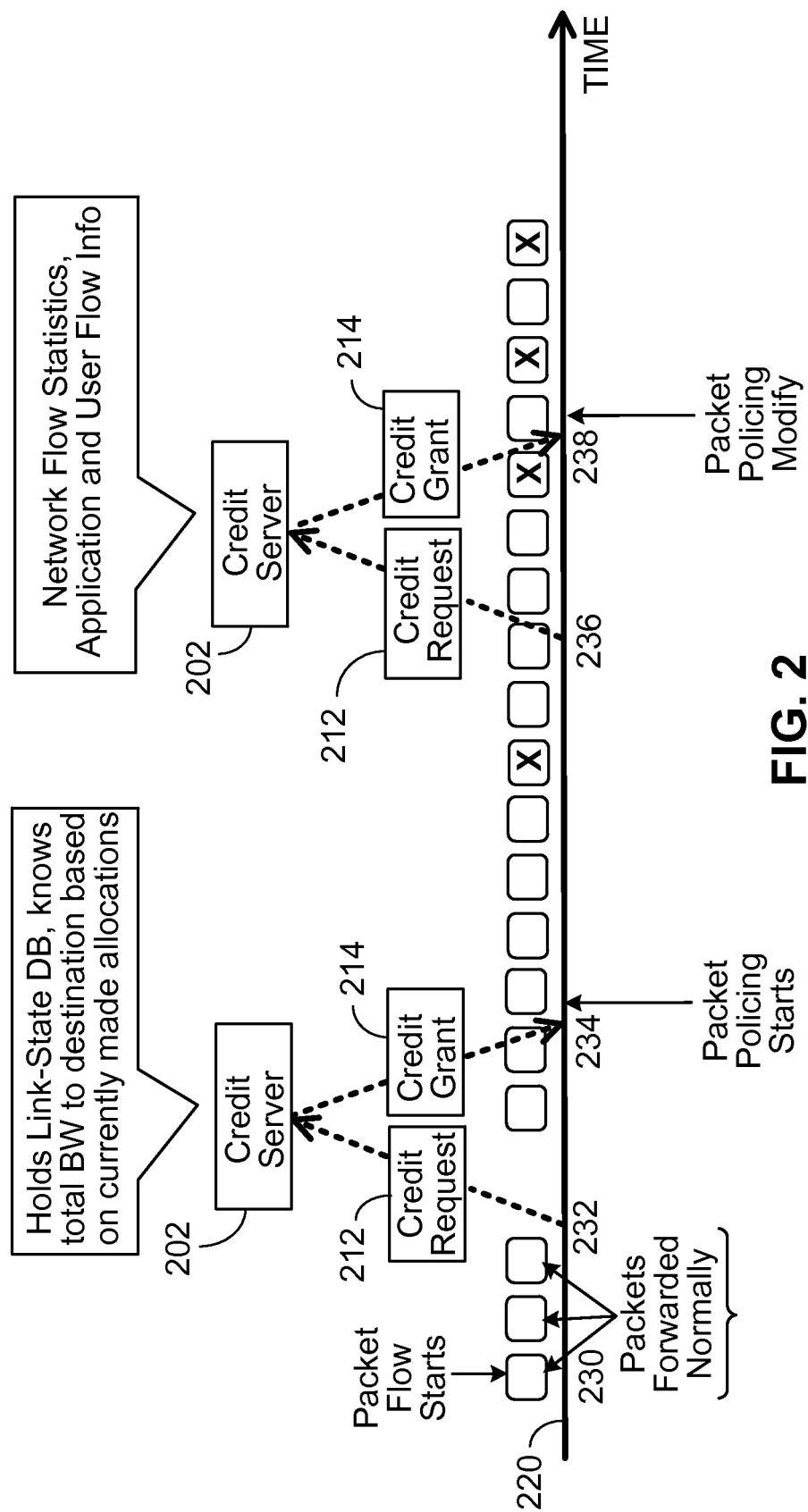
FIG. 2 illustrates an example implementation of credit request and grant.

FIG. 2 illustrates an example implementation of credit request and grant. FIG. 2 may correspond to a TCP slow start. At time instant 230, packets corresponding to packet flow 220 start to arrive at the network device. Before the number of received packets for packet flow 220 reaches the predetermined threshold, the network device forwards the received packets for packet flow normally and according to a current forwarding policy, as illustrated in FIG. 2. Once the number of received packets for packet flow 220 surpasses the predetermined threshold, the network device sends a "Credit Request" 212 to NCS 202 at time instant 232. As discussed above, "Credit Request" 212 can include information encoding a pair of source and destination addresses. Depending on the definitions in the SLAs (available at NCS 202), "Credit Request" 212 can include, for example, either IP or MAC addresses. Credit Request" 212 can specify the VLAN id, if, for example, SLAs on the NCS 202 are based on VLANs.

NCS 202 maintains a database that includes state information for each link on the managed network. The state information includes currently allocated bandwidth to a particular customer on a given link in the managed network. NCS 202 can ascertain the total bandwidth still available on a given link to the destination address based on the allocations already made. NCS 202 issues a credit grant 214 if the available resources on a given link can accommodate the Credit Request 212. For example, if the total bandwidth still available in a particular path associated with the pair of source and destination address is larger than a bandwidth indicated by the Credit Request 212, NCS 202 issues the Credit Grant 214. After issuance, NCS 202 updates the database that includes the state information for each link on the managed network to reflect that additional network resources have been committed resulting from Credit Grant 214.

At time instant 234, the Credit Grant 214 arrives at the network device and packets policing based on the grant takes effect starting from the next packet to be transmitted thereafter. The next packet is for the same packet flow 220. In some implementations, the policing may cause packets to be dropped, as indicated in FIG. 2 and discussed above in association with FIG. 1. The dropping can be because the grant has expired after a period of time or a number of packets transmissions.

At time instant 236, the network device sends Credit Request 216 to NCS 202. The network device may send Credit Request 216 to renew Credit Grant 214. As discussed above, NCS is aware of network topology information including network flow statistics and information on resources already committed on the links on the managed network. The NCS 202 grants the Credit Request 216 in a manner similar to the discussions above. The NCS 202 issues Credit Grant 218 if the available resources on a given link can accommodate the Credit Request 216. For example, if the total bandwidth still available in a particular path associated with the pair of source and destination address is larger than a bandwidth indicated by the Credit Request 216, NCS 202 issues the Credit Grant 218. After issuance, NCS 202 updates the database that includes state information for each link on the managed network to reflect that additional network resources have been committed resulting from Credit Grant 218.

At time instant 238, the Credit Grant 218 arrives at the network device and packets policing based on Credit Grant 218 takes effect starting from the next packet to be transmitted thereafter. The next packet is for the same packet flow 220. In some implementations, the policing can cause packets to be dropped, as indicated in FIG. 2 and discussed above in association with FIG. 1. The grant expires after a period of time or a number of packet transmissions.

TCP retransmit window does not present an obstacle to various implementations. The TCP retransmit window can be, for example, about 200 ms. The NCS request/response can arrive within, for example, about 100 us. Therefore, if the packet is dropped due to congestion, then the application recovers after 200 ms. If, however, the NCS takes 100 us to determine the right path, the NCS can incur an additional initial latency of 100 us to forward the packet. However, this 100 us latency is much shorter than an application retransmitting after 200 ms.

Figure 3:
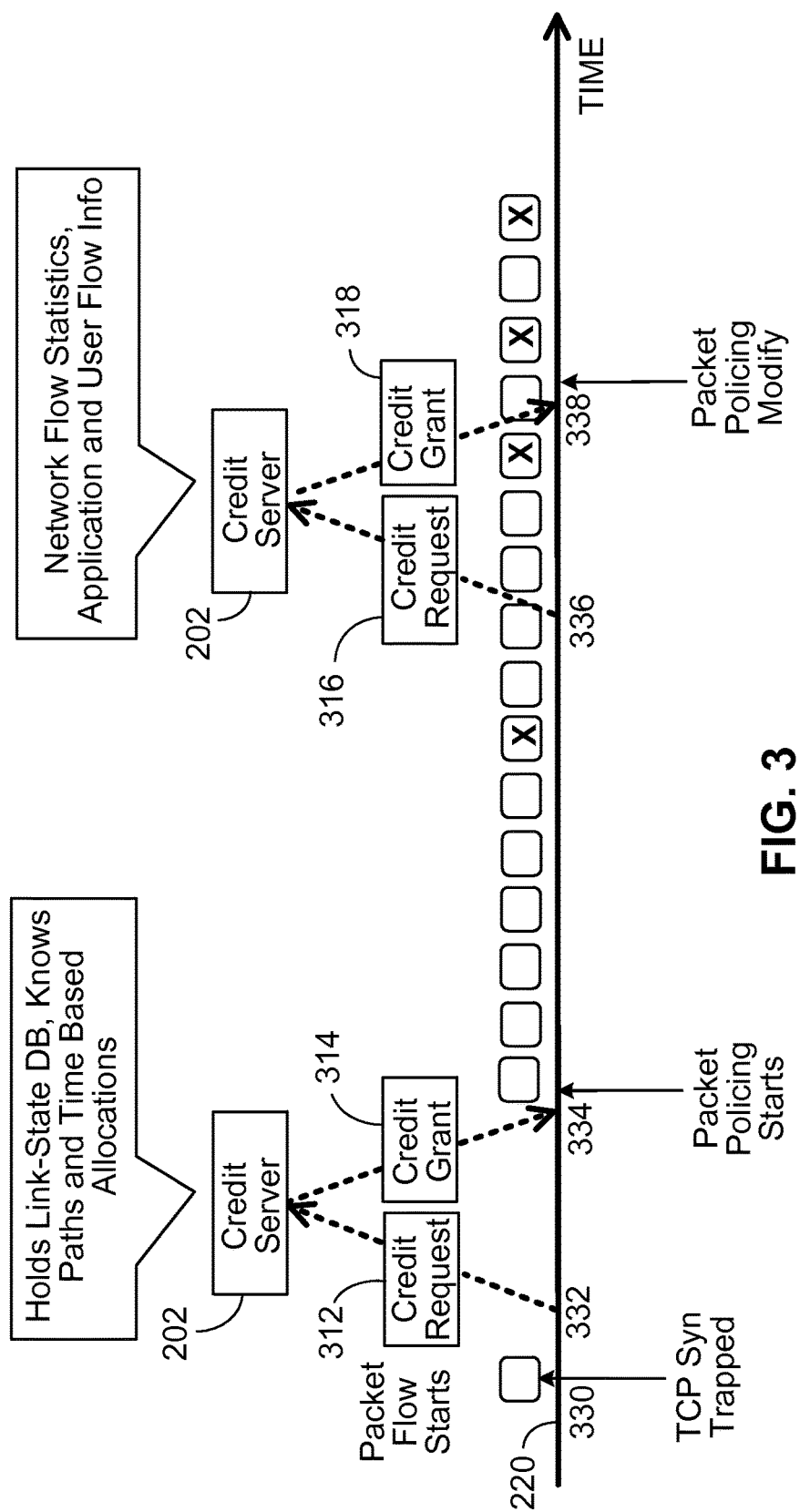
FIG. 3 illustrates another example implementation of credit request and grant.

FIG. 3 illustrates another example implementation of credit request and grant. At time instant 240, packets corresponding to packet flow 220 start to arrive at the network device. The packet flow 220 corresponds to a trap condition for trapping TCP synchronization messages during the first step of a TCP handshake in order to send a "Credit Request" 312 to NCS 202. In particular, once the trap condition occurs, the network device sends a "Credit Request" 312 to NCS 202 at time instant 332. As discussed above, "Credit Request" 312 includes information encoding a pair of source and destination addresses.

NCS 202 maintains a database containing state information for each link on the managed network. As discussed above, NCS 202 knows the total bandwidth still available on a given link to the destination address based on the allocations already made. NCS 202 issues a Credit Grant 314 if the available resources on a given link can accommodate the Credit Request 312. After issuance, NCS 202 updates the database containing state information for each link on the managed network to reflect that additional network resources have been committed resulting from Credit Grant 314.

At time instant 334, the Credit Grant 314 arrives at the network device and packets policing based on the grant takes effect starting from the next packet to be transmitted thereafter. The next packet may be for the same packet flow 220. As discussed above, the grant expires after a period of time or a number of packet transmissions.

At time instant 336, the network device sends Credit Request 316 to NCS 202. The network device sends Credit Request 316 to renew Credit Grant 314. As discussed above, NCS 202 grants the Credit Request 316 in a manner similar to the discussions above. The NCS 202 issues Credit Grant 318 if the available resources on a given link can accommodate the Credit Request 316. After issuance, NCS 202 updates the database containing state information for each link on the managed network to reflect that additional network resources have been committed resulting from Credit Grant 318.

At time instant 338, the Credit Grant 318 arrives at the network device and packets policing based on Credit Grant 318 takes effect starting from the next packet to be transmitted thereafter. The next packet is for the same packet flow 220. As discussed above, the grant expires after a period of time or a number of packet transmissions.

The example implementations described herein employ a credit-based system for ensuring SLAs. Network devices on a managed network obtain a grant of credit from a centralized credit server before the network device starts to police packets (e.g., rate limits them to the granted value).

Current mechanisms apply network policies at different points in the managed network. Coordination across the different points can incur prohibitive overhead. Therefore, the SLAs of a customer may not be dynamically coordinated across the different points in the managed network based on current mechanism. For example, a customer can use ten different servers in a data center, and may reserve a total bandwidth of 4 Gbps across these ten servers. Current mechanisms are generally incapable of achieving the dynamic allocation of this total bandwidth of 4 Gbps across the ten different servers of the data center. The bandwidth coordination across different paths is not feasible with current mechanisms. The credit mechanism generally allows a single point of policy enforcement for global and static coordination amongst various points.

Using some implementations disclosed herein, 4 Gbps can be distributed dynamically on all the paths between the ten servers of the data center. A network service provider can create bandwidth SLAs and charge their customers for bandwidth usage. The network service provider can provision a variety of bandwidth policies. The policies can include, for example, host-to-host traffic in the data center, site-to-site traffic between two sites, total bandwidth across multiple sites or set of servers, total bandwidth per customer in the managed network, etc. A host can be, for example, a data server in the managed network, a data server outside the managed network, a client laptop accessing a data server, etc. A site can include servers on a given subnet, servers at a particular physical location, servers at a certain domain, etc. In some configurations, these policies are enforced by the NCS and the switches/routers that interact with the NCS. The entities involved in the enforcement may include access switches in a datacenter, or edge routers in a service provider (SP) network.

In some implementations, providers and their customers obtain a variety of network-based metrics from the NCS. These metrics can include, for example, prominent server-to-server flows (e.g., elephant flows), customer specific traffic patterns, time-based traffic patterns across sites, etc.

In some implementations, servers or customers can reduce packet drops in the network by using a substantially optimal path to route the packets from point A to point B on the managed network. The path optimization improves network utilization and may avoid over-provisioning the network because the optimized path for a packet flow is dynamically selected rather than statically determined. The path optimization can be implemented as policy based routing using the NCS. The traffic in the data center tends to be evenly distributed resulting from, for example, a routing policy to balance traffic load in the network.

Some implementations selectively drop or allow packet flows for specific applications or customers. Using the selective feature of some implementations, a service provider can create application or customer specific charging models across the network.

Cloud service providers can use some implementations disclosed herein to create network SLA for server-to-server traffic. IP next generation network (IP NGN) providers can use some implementations disclosed herein to provide improved quality of service (e.g., customer specific bandwidth or bandwidth for specific application). Some implementations can provide end-to-end and client-to-cloud bandwidth SLAs. Some implementations can utilize per use models based on use patterns. Some implementations can utilize differentiated billing models based on, for example, time-based patterns. The NCS is a singe point to record the use patterns and the time-based patterns. The single point feature also enables configuring policies (e.g., the SLAs) in one place (e.g., the NCS). This single point feature further provides operational ease in creating policies (e.g., SLAs), obtaining data showing flow patterns, obtaining analytics of network traffic, and creating billing models for users.

Another aspect involves pinning a packet flow to a path on the managed network. In principle, a network device can pin the path of a packet flow by sending, for example, a list of switch id's through which the packet may be passed, a label stack of multiprotocol label switching (MPLS) labels, or a stack of switch media access control (MAC) addresses. These approaches, while possible, do not scale well, in the sense that each network device on the managed network stores parameters related to each "flow", and if the number of flows grows very high, the cost of book keeping by all the network devices becomes prohibitively high.

To address the above-mentioned scaling issues, some implementations allow the network devices on the managed network to decide on the specific path to forward the packet flow at a given time. The network device forwarding the packet flow considers the specific path as the best path. In particular, when congestion occurs on a given path, the network devices on the managed network can propagate a dynamic "path cost," as discussed below. This "congestion notification" can be an Ethernet PAUSE frame, or other kinds of control plane enhancements (e.g. routing updates with link specific cost updates for L2/L3).

Figure 4:
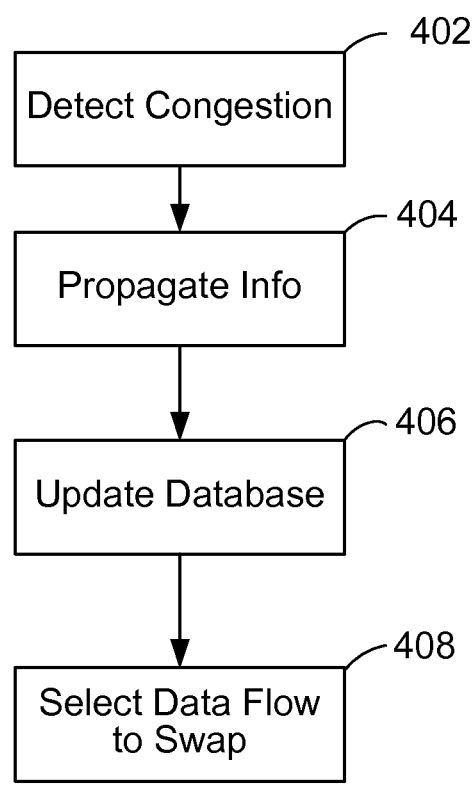
FIG. 4 shows another flow chart of an example implementation.

FIG. 4 shows another flow chart of an example implementation. In block 402, a network device receives a congestion notification. In some implementations, the congestion notification is generated by a neighboring network device. In some implementations, the congestion notification indicates time-out conditions on a given link. In some other implementations, the congestion notification indicates a link failure on a given link, as discussed below in association with FIG. 5

In response to the congestion notification, the network device propagates the congestion notification in the managed network, for example, to other network devices and the NCS, as illustrated in block 404. In some embodiments, the network device propagates the congestion notification by relaying the received congestion notification. In some other embodiments, the network device propagates the congestion notification by encapsulating the payload of the received congestion notification packet into a notification packet from the network device. In some other implementations, the network device propagates the congestion notification by generating a brand new notification.

In block 406, the NCS updates the database of the network topology information to reflect the congestion.

Thus, the NCS tracks the live state information of all links in the managed network. Subsequent credit requests will be considered in view of the most current network topology information.

Figure 5:
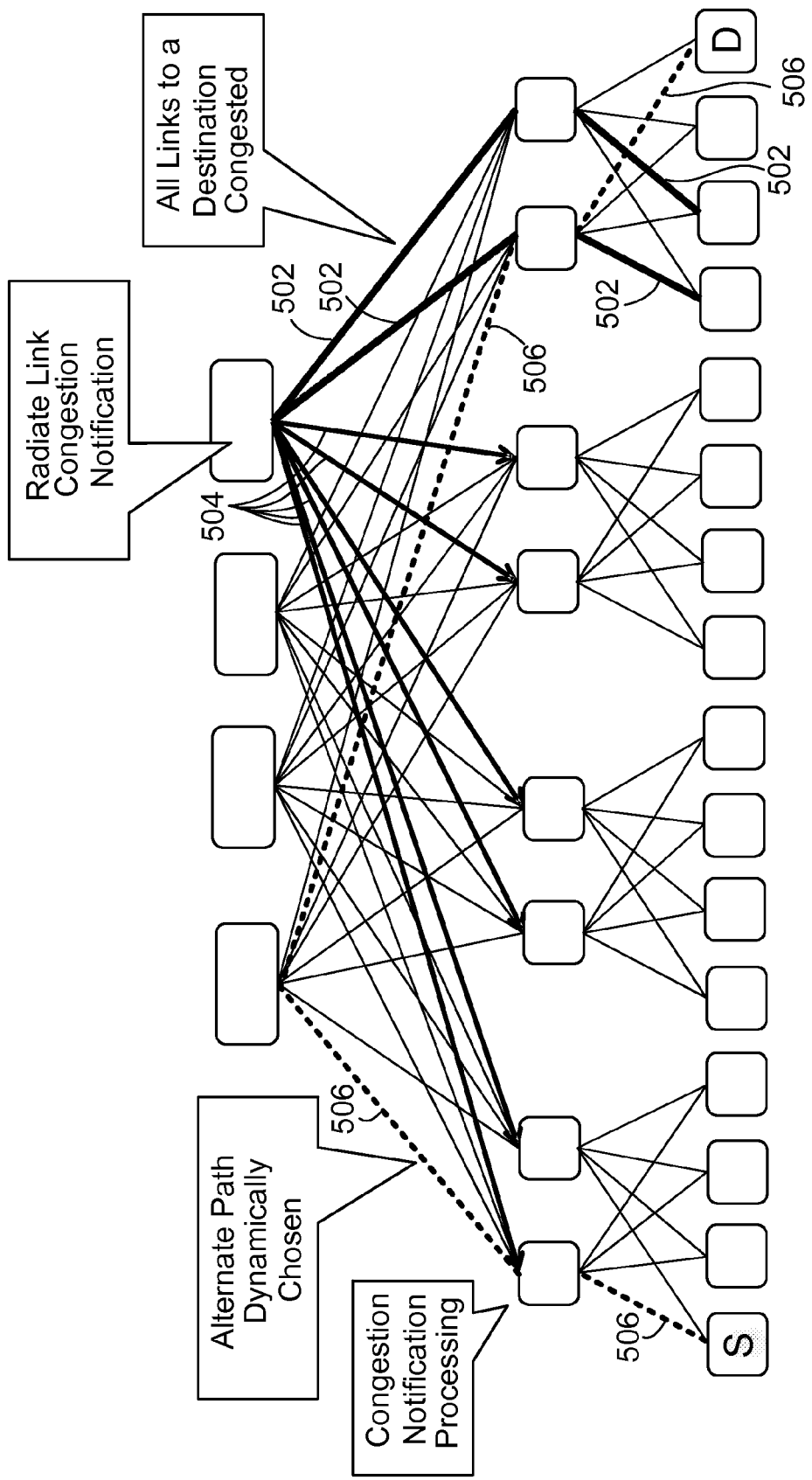
FIG. 5 illustrates an example response to a congested link according to an implementation.

FIG. 5 illustrates an example response to a congested link according to an implementation. Source S transmits a packet flow to destination D through a managed network. The managed network includes network devices, such as access switches and routers, as discussed above. The packet flow from source S to destination D can take, for example, sixteen different paths in FIG. 5. Each path traverses several links between the network devices of the managed network. As illustrated in FIG. 5, links 502 become congested because, for example, traffic on links 502 has exceeded the bandwidth limit. The congestion on links 502 indicates that links 504 are unattractive to the packet flow from source S to destination D because subsequent packets on links 504 will be stuck when they are forwarded onto links 502 (which is congested). Therefore, the link congestion should be radiated to network devices associated with links 504. The network devices associated with links 504 process the congestion notification and then choose links 506 as alternate paths for subsequent packets of the packet flow for source S to destination D.

When a link failure occurs, flow redirection will take place in the managed network. For example, a central arbiter present on one of the network devices or the NCS. The central arbiter is aware of current state of links in the network, including the link failure that has just occurred. The central arbiter on a network device then computes shortest paths for each packet flow departing the network device. If a given packet flow is pinned to a path on which a link has failed, then the central arbiter redirects the pinned flow to other paths, on subsequent requests. If the central arbiter only performs admission control and the network devices on the managed network dynamically determine a path for a given packet flow, then a link failure on the path causes congestion message to be signaled to upstream network devices. The upstream network devices then install ACLs on downstream network devices to redirect subsequent packets of the affected flows.

Figure 6:
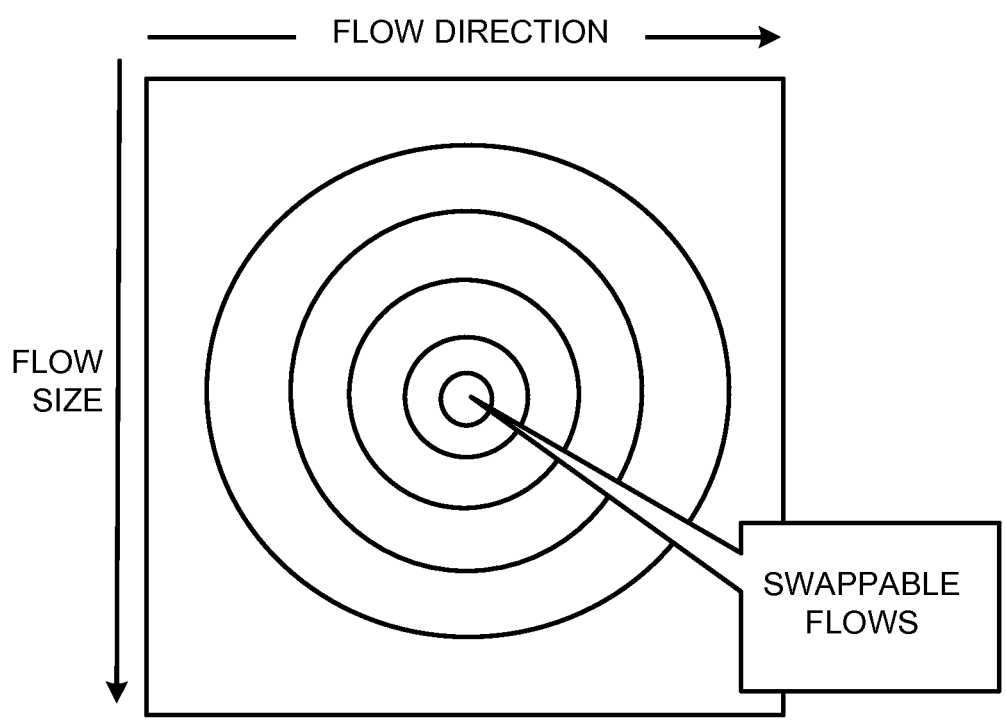
FIG. 6 illustrates example dimensions of a swappable flow.

Returning to FIG. 4, in block 408, the NCS may choose packet flows suitable for "swapping" from existing paths to new paths. These swapped packet flows may account for a very small percentage of the total number of packet flows. For example, the swapped packet flows may typically account for less than 10% of the total number of packet flows. The choice can factor in two considerations. First, the packet flow is neither an elephant flow nor a mouse flow. Elephant flow is an extremely large (in total bytes) continuous flow set up by, for example, TCP (or other protocol). Elephant flows, though not numerous, can occupy a disproportionate share of the total bandwidth over a period of time. Mouse flow, however, tends to be short (in total bytes) flow set up by, for example, TCP (or other protocol). In other words, the swappable flow is intermediate sized packet flows. Second, the packet flow is not very long- lived or not very short-lived. In other words, the swappable flow is intermediate in duration. The rational basis for the two considerations may include the fact that swapping elephant flows can cause flow toggling, and swapping very small or short-lived flows may not help mitigating the congestion. FIG. 6 summarizes the example swappable flow in two dimensions, namely, the size and duration.

As discussed above in association with FIG. 1, the NCS uses network statistics to determine which flows are swappable based on the above considerations. Once the swappable flows have been determined based on network statistics, the NCS can install access control lists (ACLs) on a particular network device to redirect these flows to alternate paths. In effect, another aspect of the implementations involves the installation of a redirect ACL for each flow, or a flow specific access table. The NCS can remove these ACLs as soon as congestion eases. In some implementations, the ease condition can be signaled through a control plane protocol or after a certain pre-defined timer. The NCS can use the ease condition signal to remove these ACLs.

By default, the managed network routes each packet to one of the equal cost multiple path (ECMPs) based on a hash computation. The hash computation can be based on five tuples, namely, source MAC address (SMAC), destination MAC address (DMAC), source IP address (S-IP), destination IP address (D-IP), and port. The installed ACL according to some implementations can override the above hash computation results. When the ACL is removed, the path determined by the hash computation will be restored as the default. Therefore, installing ACLs to redirect flows may only occur when a link congestion has occurred in the managed network.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for implementing a service level agreement in a network, the method comprising:
    storing, at a Network Credit Server (NCS), a service level agreement of a customer, the service level agreement providing an upper limit of resources in the network allocable to the customer;
    maintaining, at the NCS, a database of topology information of the network, the topology information including bandwidth capacity information of links in the network;
    receiving, at the NCS, a request from a network device where a first plurality of packets associated with the customer have been received en-route to a destination and when the number of the first plurality of packets surpasses a pre-configured threshold number;
    generating, by the NCS, a reply based on the service level agreement of the customer and the topology information of the network; and
    sending, from the NCS, the reply to the network device for the network device to process a second plurality of packets associated with the customer, the second plurality of packets being received at the network device subsequent to the first plurality of packets and en-route to the destination.

2. The method of claim 1, wherein storing the service level agreement comprises storing a service level agreement that provides a bandwidth policy that includes at least one of: a host-to-host bandwidth, a site-to-site bandwidth, a total bandwidth across multiple sites or servers, or a total bandwidth for a particular customer on a given link in the network.

3. The method of claim 1, wherein generating the reply includes generating an express grant of the request conditioned on:
    the topology information indicates resources being available in the network, and
    the request for credit does not cause resources in the network already allocated and to be allocated to the customer to exceed the upper level limit associated with the customer, the upper level limit provided by the service level agreement of the customer.

4. The method of claim 3, further comprising:
    updating the topology information of the network to reflect the express grant of the request for credit.

5. The method of claim 3, wherein the credit granted is valid for one of: a pre-determined number of packets, a pre-determined amount of time, or combinations thereof.

6. The method of claim 1, further comprising:
    receiving a notification of a congestion detected in the network;
    in response thereto, updating the database of topology information maintained at the NCS; and
    causing at least one data flow to be selected such that packets associated with the at least one data flow are re-routed from an old path to a new path through the network, the new path bypassing the congestion.

7. The method of claim 6, wherein the at least one data flow is neither an elephant flow nor a mouse flow, and wherein the packets of the at least one data flow are associated with the customer.

8. The method of claim 6, wherein the at least one data flow is re-routed according to an Access Control List (ACL) associated with the data flow, the ACL installed on the network device and other network devices in the network in response to the congestion.

9. A network device comprising: one or more programmable processors and one or more storage devices storing instructions that are operable, when executed by the one or more programmable processors, to cause the one or more programmable processors to perform operations comprising:
    storing, at a Network Credit Server (NCS), a service level agreement of a customer, the service level agreement providing an upper limit of resources in the network allocable to the customer;
    maintaining, at the NCS, a database of topology information of the network, the topology information including bandwidth capacity information of links in the network;
    receiving, at the NCS, a request from a network device where a first plurality of packets associated with the customer have been received en-route to a destination and when the number of the first plurality of packets surpasses a pre-configured threshold number;
    generating, by the NCS, a reply based on the service level agreement of the customer and the topology information of the network; and
    sending, from the NCS, the reply to the network device for the network device to process a second plurality of packets associated with the customer, the second plurality of packets being received at the network device subsequent to the first plurality of packets and en-route to the destination.

10. The network device of claim 9, wherein storing the service level agreement comprises storing a service level agreement that provides a bandwidth policy that includes at least one of: a host-to-host bandwidth, a site-to-site bandwidth, a total bandwidth across multiple sites or servers, or a total bandwidth for a particular customer on a given link in the network.

11. The network device of claim 9, wherein generating the reply includes generating an express grant of the request conditioned on:
   the topology information indicates resources being available in the network, and
   the request for credit does not cause resources in the network already allocated and to be allocated to the customer to exceed the upper level limit associated with the customer, the upper level limit provided by the service level agreement of the customer.

12. The network device of claim 11, wherein the operations further comprise:
   updating the topology information of the network to reflect the express grant of the request for credit.

13. The network device of claim 11, wherein the credit granted is valid for one of: a pre-determined number of packets, a pre-determined amount of time, or combinations thereof.

14. The network device of claim 9, wherein the operations further comprise:
   receiving a notification of a congestion detected in the network;
   in response thereto, updating the database of topology information maintained at the NCS; and
   causing at least one data flow to be selected such that packets associated with the at least one data flow are re-routed from an old path to a new path through the network, the new path bypassing the congestion.

15. A computer program product, embodied in a non-transitory machine-readable medium and including instructions executable by a processor, the instructions operable to cause the processor to perform functions including:
   storing, at a Network Credit Server (NCS), a service level agreement of a customer, the service level agreement providing an upper limit of resources in the network allocable to the customer,
   maintaining, at the NCS, a database of topology information of the network, the topology information including bandwidth capacity information of links in the network;
   receiving, at the NCS, a request from a network device where a first plurality of packets associated with the customer have been received en-route to a destination and when the number of the first plurality of packets surpasses a pre-configured threshold number;
   generating, by the NCS, a reply based on the service level agreement of the customer and the topology information of the network; and
   sending, from the NCS, the reply to the network device for the network device to process a second plurality of packets associated with the customer, the second plurality of packets being received at the network device subsequent to the first plurality of packets and en-route to the destination.

16. The computer program product of claim 15, wherein storing the service level agreement comprises storing a service level agreement that provides a bandwidth policy that includes at least one of: a host-to-host bandwidth, a site-to-site bandwidth, a total bandwidth across multiple sites or servers, or a total bandwidth for a particular customer on a given link in the network.

17. The computer program product of claim 15, wherein generating the reply includes generating an express grant of the request conditioned on:
   the topology information indicates resources being available in the network, and
   the request for credit does not cause resources in the network already allocated and to be allocated to the customer to exceed the upper level limit associated with the customer, the upper level limit provided by the service level agreement of the customer.

18. The computer program product of claim 15, further comprising:
   updating the topology information of the network to reflect the express grant of the request for credit.

19. The computer program product of claim 18, wherein the credit granted is valid for one of: a pre-determined number of packets, a pre-determined amount of time, or combinations thereof.

20. The computer program product of claim 15, wherein the operations further comprise:
   receiving a notification of a congestion detected in the network;
   in response thereto, updating the database of topology information maintained at the NCS; and
   causing at least one data flow to be selected such that packets associated with the at least one data flow are re-routed from an old path to a new path through the network, the new path bypassing the congestion.

* * * * *